United States Patent [19]
Brown et al.

[11] Patent Number: 5,802,448
[45] Date of Patent: Sep. 1, 1998

[54] METHOD AND APPARATUS FOR PROCESSING REQUESTS FOR INTERACTIVE APPLICATIONS BASED ON SYSTEM RESOURCES

[75] Inventors: Ralph W. Brown, Boulder; Michael T. Hayashi, Aurora, both of Colo.

[73] Assignee: Time Warner Entertainment Co., L.P., Stamford, Conn.

[21] Appl. No.: 572,439

[22] Filed: Dec. 14, 1995

[51] Int. Cl.$^6$ .............................. H04H 1/00; H04N 7/14
[52] U.S. Cl. .................................. 455/5.1; 348/7; 348/12; 455/6.1
[58] Field of Search ........................ 348/6, 7, 10, 12, 348/13; 455/3.1, 4.1, 4.2, 5.1, 6.1, 6.2; 395/200.47–200.49; H04N 7/10, 7/14, 7/173

[56] References Cited

U.S. PATENT DOCUMENTS

| | | |
|---|---|---|
| 3,956,717 | 5/1976 | Fisher et al. |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. |
| 4,823,386 | 4/1989 | Dumbauld et al. |
| 4,991,208 | 2/1991 | Walker et al. |
| 5,046,090 | 9/1991 | Walker et al. |
| 5,093,718 | 3/1992 | Hoarty et al. |
| 5,168,353 | 12/1992 | Walker et al. |
| 5,220,420 | 6/1993 | Hoarty et al. |
| 5,255,267 | 10/1993 | Hansen et al. |
| 5,311,423 | 5/1994 | Clark . |
| 5,343,239 | 8/1994 | Lappington et al. |
| 5,357,276 | 10/1994 | Banker et al. |
| 5,361,091 | 11/1994 | Hoarty et al. |
| 5,383,112 | 1/1995 | Clark . |
| 5,390,337 | 2/1995 | Jelinek et al. |
| 5,394,394 | 2/1995 | Crowther et al. |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. |
| 5,423,555 | 6/1995 | Kidrin . |

(List continued on next page.)

OTHER PUBLICATIONS

Adams, Michael, "Network Design and Implementation of a large–scale, ATM, Multimedia Network," *Engineer Conference Notes* from NETWORLD$^{SM}$+INTEROP® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," Timewarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

*Primary Examiner*—Mark R. Powell
*Assistant Examiner*—John W. Miller
*Attorney, Agent, or Firm*—Homer L. Knearl; Holland & Hart llp

[57] ABSTRACT

For an interactive communication system, a method and apparatus for processing requests for interactive applications. One embodiment of the invention initially receives a request to transmit a first presentation of a particular interactive application. This embodiment then determines if transmission of the first presentation would constrain resources of the interactive communication system. If the system's resources would be constrained, then this embodiment causes a second presentation of the particular interactive application to be transmitted. This second presentation expends less resources of the system than the first presentation.

18 Claims, 7 Drawing Sheets

U.S. PATENT DOCUMENTS

| | | |
|---|---|---|
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,682,325 | 10/1997 | Lightfoot ................................ 348/7 |

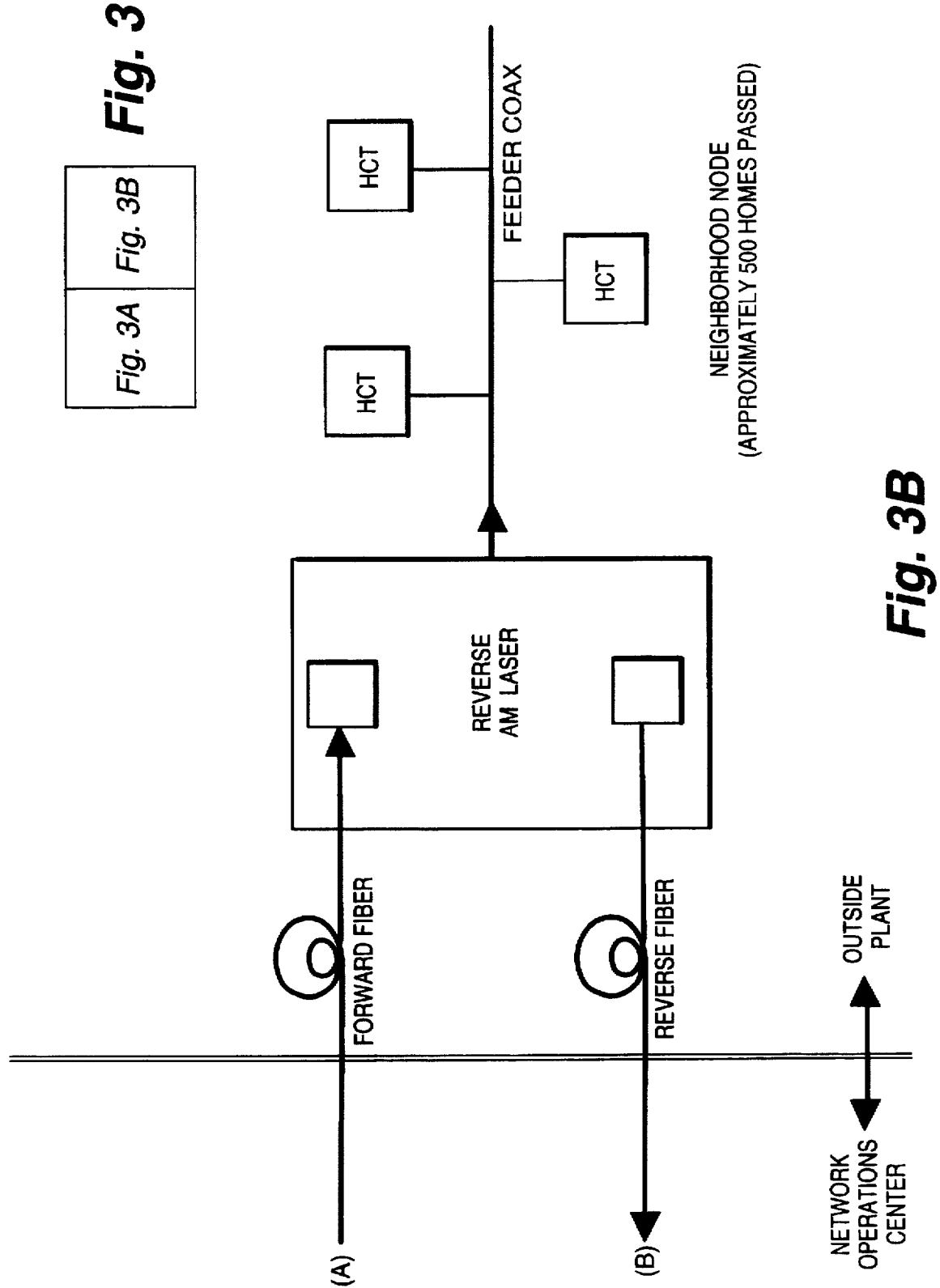

METHOD AND APPARATUS FOR PROCESSING REQUESTS FOR INTERACTIVE APPLICATIONS BASED ON SYSTEM RESOURCES

The present invention is directed towards a method and apparatus for processing requests for interactive applications.

BACKGROUND OF THE INVENTION

Traditionally, television has been used as a passive device, that only allows a viewer to control the volume and channel, while reserving control of the content as well as the presentation time and format for the service provider. In recent years, however, a number of interactive systems have been created, in order to enable viewers to use their televisions as interactive devices.

Specifically, with the advent of interactive services in the home entertainment field, televisions have become active devices, that allow their viewers greater flexibility and control over the content, the presentation time, and the presentation format of their selected interactive applications. Interactive applications are stored programs, whose operations are wholly or partly controlled by commands from local viewing nodes of the interactive system.

Interactive systems utilize a mix of broadcast and point-to-point communication modes. In particular, interactive systems transmit shared, one-way, broadcast digital information streams to all their subscribers, in order to provide cable and network programming to their subscribers. Interactive systems also utilize a number of dedicated, two-way communication paths to (1) provide interactive applications from a central service source to a local viewing node, and (2) relay commands from the local viewing node to the central service source. In addition, some interactive systems transmit interactive applications through shared information streams.

Establishing a dedicated communication link expends a certain amount of an interactive system's shared resources (such as a service source's server resources, a communication network's transmission bandwidth and switching resources, etc.). Consequently, as typical interactive systems have finite resources due to financial considerations, these systems are not designed to simultaneously transmit interactive applications to all of their possible viewers over dedicated communication links.

Rather, efficient interactive systems are often designed to handle specified peak dedicated-path-usage rates, which are computed by using statistics and probability. This type of peak rate design is analogous to the peak rate design used in telephone systems, which similarly use such a design for reducing hardware costs (i.e., telephone systems similarly are not designed to support simultaneous system accesses from all their subscribers, but rather are designed to support a peak rate of callers in order to reduce the system costs).

Moreover, like telephone systems, prior art interactive communication systems only provide a busy signal to inform a viewer that a requested interactive service is unavailable, when the peak dedicated communication path usage rate is reached. This solution is undesirable from both the consumer's and the service provider's perspective. However, this is the only solution offered by the prior art interactive systems.

Consequently, there is a need in the art for a interactive application request processing scheme that provides a viewer with a useful presentation of an interactive application, even when the peak dedicated-path usage rate is reached. For instance, there is a need in the art for a request processing scheme which (1) receives a request for a first presentation of an interactive application, (2) detects that the display of the first presentation would cause the dedicated-path-usage rate to exceed its peak value, and (3) provides a second presentation of the interactive application that expends less system resources than the first presentation.

SUMMARY OF THE INVENTION

For an interactive communication system, the invention provides a method and apparatus for processing requests for interactive applications. One embodiment of the invention initially receives a request for a display of a first presentation of a particular interactive application. This embodiment then determines if this display would constrain resources of the interactive communication system. If the system's resources would be constrained, then this embodiment causes a second presentation of the particular interactive application to be displayed. This second presentation expends less resources of the system than the first presentation.

BRIEF DESCRIPTION OF THE DRAWINGS

The novel features of the invention are set forth in the appended claims. However, for purpose of explanation, several embodiments of the invention are described by reference to the following figures.

DETAILED DESCRIPTION OF THE INVENTION

The invention provides a method and apparatus for processing requests for interactive applications. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

The invention is adapted to operate in an interactive communication system. One embodiment of the invention initially receives a request for displaying a first presentation of a particular interactive application. This embodiment then determines if this display would constrain resources of the interactive communication system. In particular, this embodiment makes this determination by utilizing a mathematical expression to determine the available capacity of the system. In other words, one embodiment of the invention utilizes a mathematical relationship to determine whether the interactive system's shared resources have sufficient bandwidth to support the display of the first presentation.

If the display of the first presentation would constrain resources of the system, then this embodiment causes a second presentation of the particular interactive application to be displayed. This second presentation expends less resources of the system than the first presentation. On the other hand, if the system's resources would not be constrained by the display of the first presentation, the invention provides the viewer with the requested first presentation.

Figure 1:
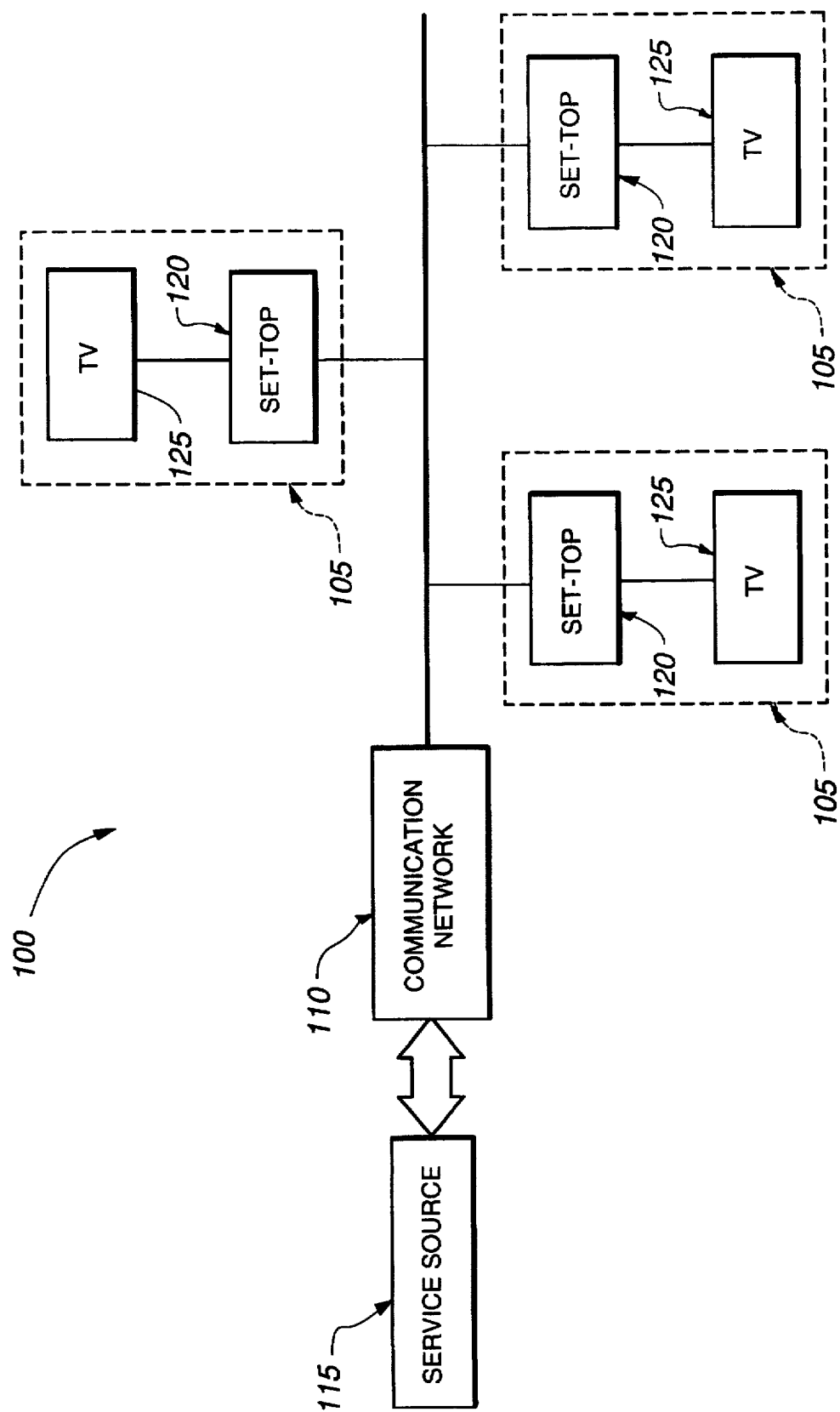
FIG. 1 presents an interactive communication system used by the invention.

FIG. 1 presents an interactive communication system 100 used by the invention. This system includes a number of home terminal nodes 105, a communication network 110, a service source 115. As shown in FIG. 1, each home terminal node 105 includes a set-top terminal 120 and a television 125. Each set-top controls the operation of its corresponding television. In particular, through communication network 110, a set-top (1) establishes a communication link between the television viewer and the service source, (2) presents, via the television, selectable programming options provided by the service source to the viewer, and (3) relays program selections from the viewer to the service source.

Figure 2:
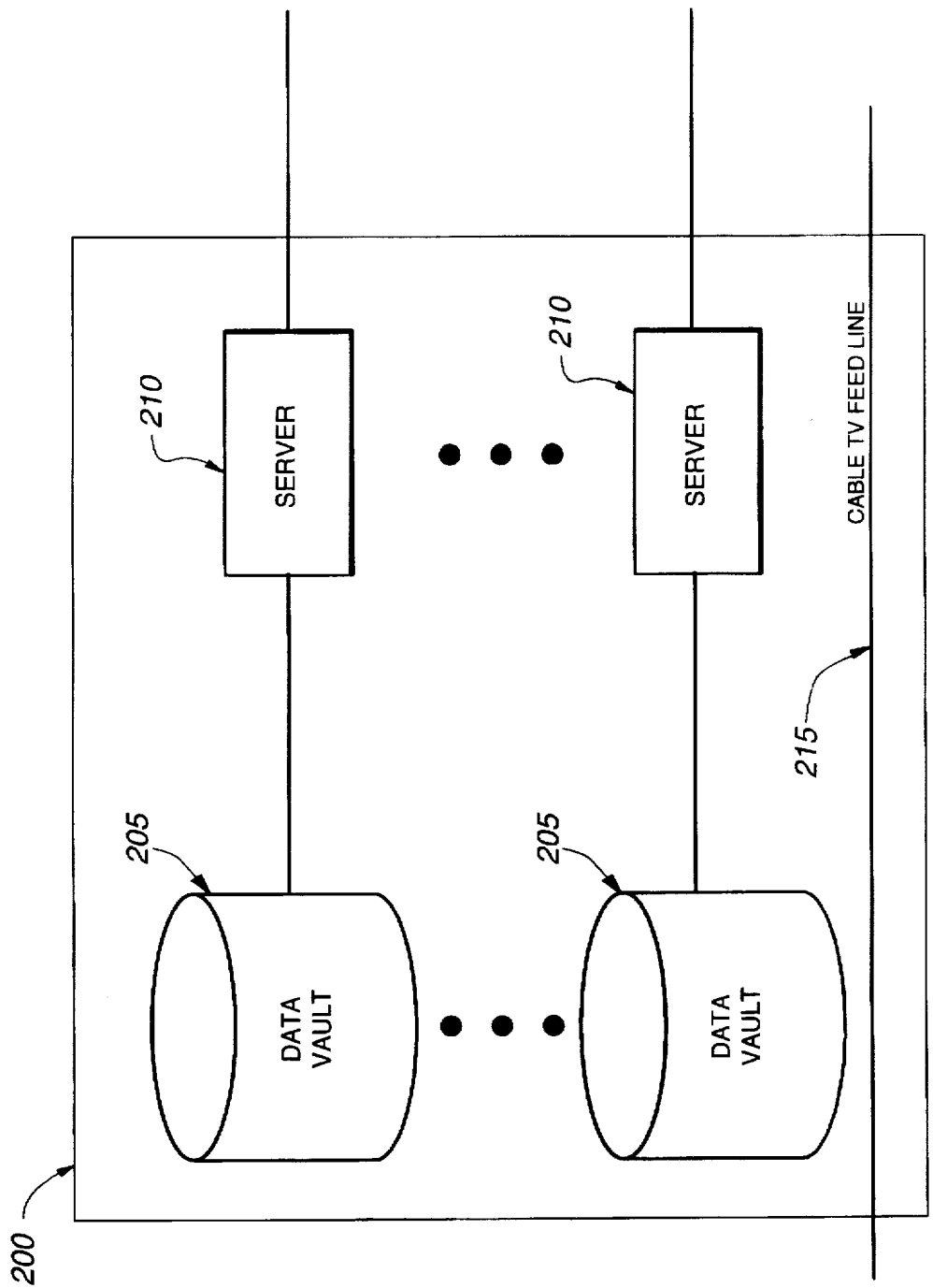
FIG. 2 presents an example of a service source used in the interactive communication system of FIG. 1.

FIG. 2 presents an example of a service source used in the interactive communication system of FIG. 1. As shown in FIG. 2, one example of the service source includes a number of data storage vaults 205, a number of media servers 210, and a cable TV feedline 215. Service source 200 utilizes data storage vaults 205 and media servers 210 to provide a variety of interactive digital services to the subscribers of the system. Specifically, data storage vaults 205 are used to store the digital programming content, and media servers 210 are used to retrieve the stored digital media in response to requests from the home terminal nodes.

The retrieved digital programs can then be transmitted through a shared information stream or a dedicated information stream. A shared information stream is used to transmit data to a number of subscribers, while a dedicated information stream is used to transmit data to a specific user. In addition, an information stream can be assigned all or part of a frequency band used by the network. As further shown in FIG. 2, service source 200 also has a cable feedline 215, which receives cable programming from the local cable company and supplies this programming to the network. The network then broadcasts the cable programming to all of the system's subscribers on shared information streams.

Figure 3A:
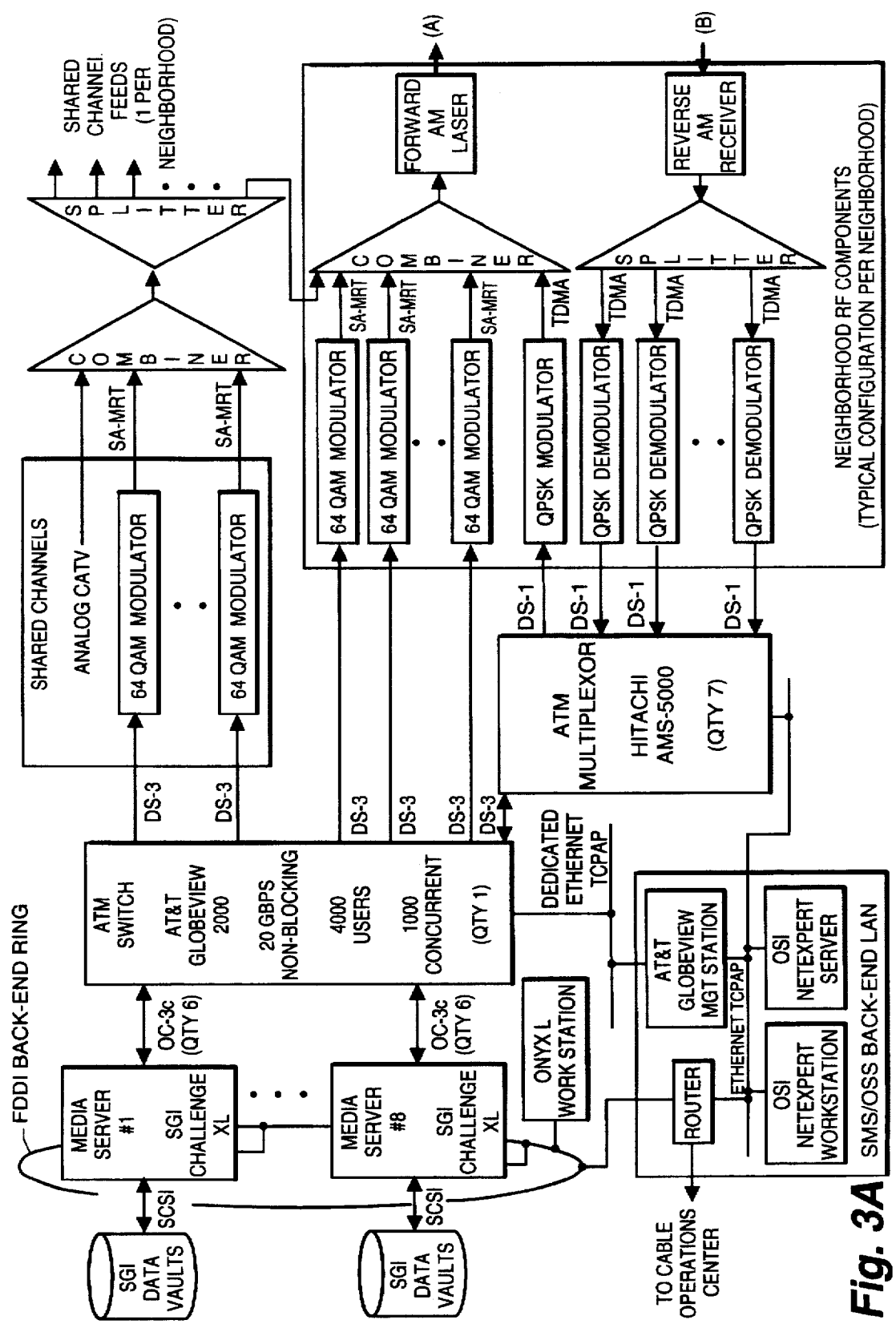
FIG. 3 presents another interactive communication system used by the invention.

FIG. 3 presents another interactive entertainment system used by the invention. A description of this interactive entertainment system is provided in the U.S. Application entitled "A Method For Message Addressing In A Full Service Network," filed on Dec. 14, 1995, and assigned to the assignee of the present application. The disclosure of this application is incorporated in the present application by reference.

Figure 4:
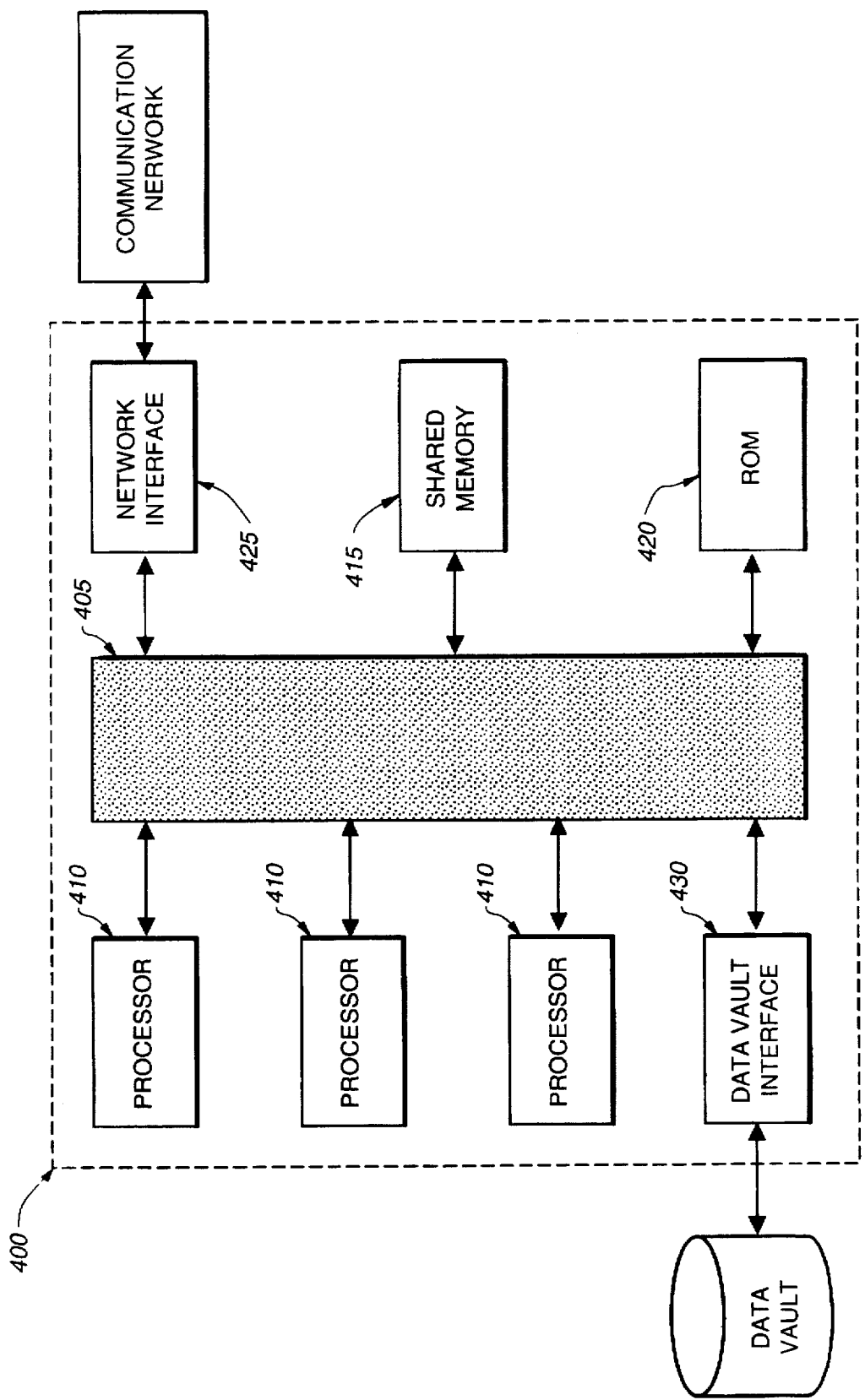
FIG. 4 presents a server used in the service source of the interactive communication system of FIG. 1.

FIG. 4 presents a server 400 used in service source 200 of FIG. 2. This server is used to retrieve stored digital interactive applications from data vaults, and to supply these applications to the communication network for transmission to the home terminal nodes. In particular, the role of the video server is to provide storage and playback of the video data and to respond to subscriber requests, such as "pause," "fast forward," "view the next product," etc. In addition, during operation, the service source's servers also store the operating system necessary for the operation of the interactive communication system.

Server 400 has a shared memory SMP (Symmetric Multiprocessing) architecture, which includes a high-speed system bus interconnecting processors, memory, and data and network I/O subsystems. Specifically, as shown in FIG. 4, server 400 includes internal bus 405, processors 410, shared random access memory 415, read-only memory (ROM) 420, network interface 425, and data vault I/O interface 430. High-speed bus 405 represents the collective communication interface between the numerous internal modules of server 400. In addition, this sever utilizes processors 410 for processing digital signals, and thereby controlling the managing the operation of the server.

Processor 410 is directed by the software and firmware instructions that respectively reside in RAM 415 and ROM 420. In particular, in one embodiment of the invention, server 400 utilizes RAM 415 to store a source code necessary for the operation of the invention (i.e., server 400 utilizes the software residing in RAM 415 to direct the invention's processing of interactive-application requests by guiding the actions of processor 410). In another embodiment of the invention, the firmware instructions (i.e., the source code residing in ROM 420) direct the invention's processing of interactive-application requests. Server 400 also uses RAM 415 to store temporary variables or other intermediate information during the operation of the processor.

Because the memory and I/O devices are shared equally among all of the processors in the system, this server's architecture is called symmetric multiprocessor systems. Typically, SMP systems scale from one processor to as many as 36 processors. Examples of SMP architecture include the Silicon Graphics, Inc. Challenge server systems and the Sun Microsystems, Inc. SPARC server systems.

In the SMP architecture, the processing load is uniformly distributed across all of the processors in the system. Scheduling algorithms in the kernel allocate processing load to unoccupied or lightly loaded processors. All processors have equal access to the physical memory and see a uniform memory image. Data written to the shared memory by one processor is immediately available to all the other processors. Software processes, both kernel and user, are able to run concurrently, and can be switched arbitrarily among any of the processors in the computer. Since all of the processors are operating out of shared memory, access to critical data and code is protected by locking mechanisms that prevent concurrent access.

As further shown in FIG. 4, server 400 also includes data vault interface 430. Through this interface, server 400 reads out data from one or more data vaults, and transfers this data to a buffer area in the shared memory 415. The data is then transferred from this buffer area to network interface 425 for transmission to the communication network. In one embodiment of the invention, the network interface is an ATM network interface which transfers data to an ATM switch for transmission. Finally, one of ordinary skill in the art would recognize that numerous alternative embodiments of server 210 exist. For example, in one embodiment of the invention, the service source's servers have an MPP (Massively Parallel Processor) architecture.

Figure 5:
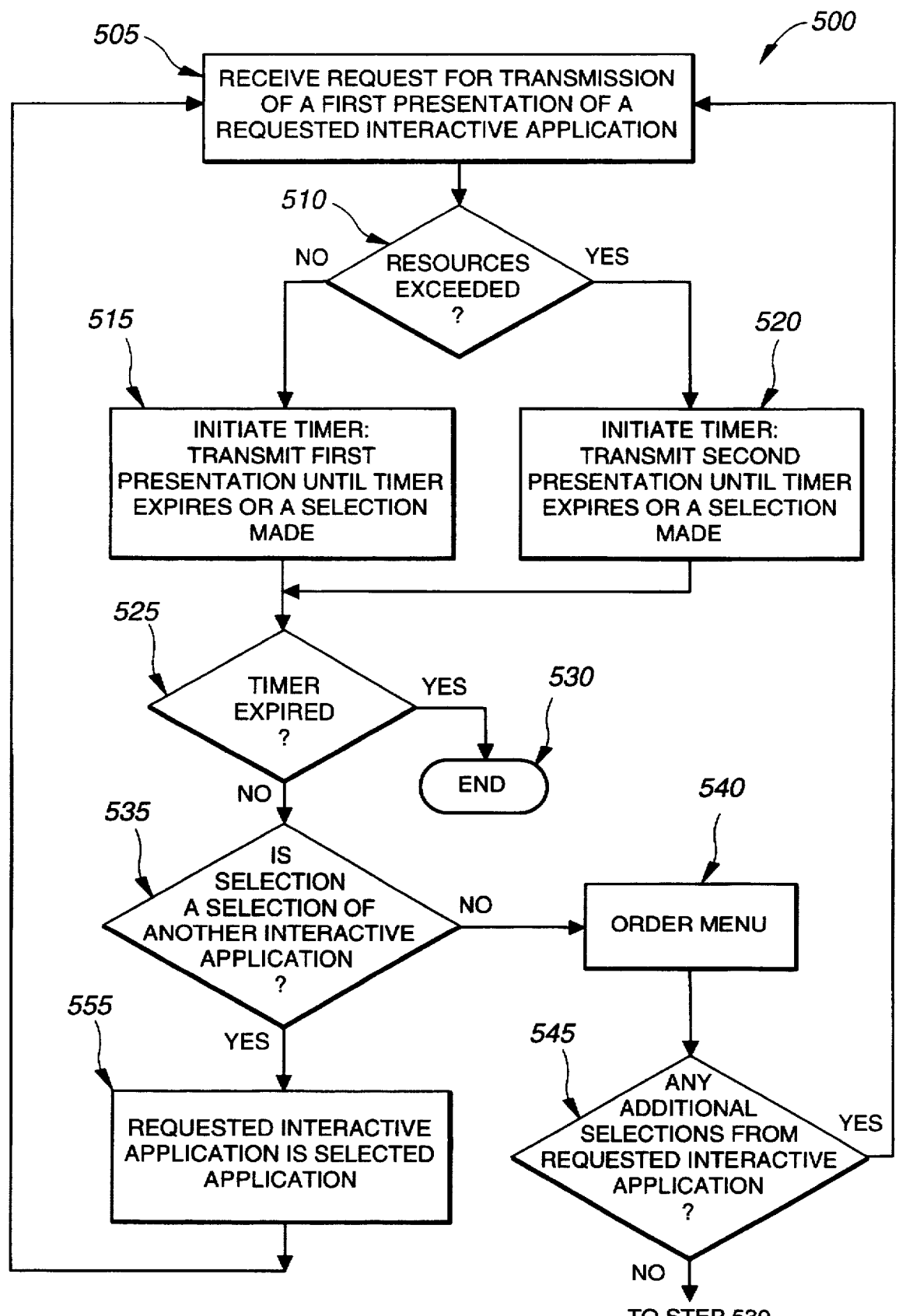
FIG. 5 presents one embodiment of the invention.

FIG. 5 presents one embodiment of the invention for processing requests for interactive applications. This embodiment of the invention can be implemented as a software or a firmware code of the server or the set-top. The following description pertains to the embodiment of the invention that is implemented as the software of the server.

The initial step in the flowchart of FIG. 5 is request step 505. At this step, the viewer requests a first presentation of a particular application. In one embodiment of the invention, the viewer actually requests the first presentation of the interactive application, after the viewer requests the interactive application and the server requests the viewer to select between a first presentation and a second presentation of the interactive application. In another embodiment of the invention, the first presentation is the default presentation of the requested interactive application (i.e., is the presentation that the server automatically attempts to provide to a viewer that requests the interactive application).

The processor then transitions to step 510, during which the server determines (1) if the resources of the system are constrained, or (2) if they would be constrained by the transmission of the first presentation to the viewer. One embodiment of the invention utilizes a mathematical relationship to determine whether the transmission of the requested first presentation would constrain the shared resources of the interactive communication system. In particular, one embodiment of the invention utilizes a mathematical expression to determine whether the interactive system's shared resources have sufficient bandwidth to support the transmission of the requested first presentation. One example of such a mathematical relationship is:

IF
{(Current_NetworkBandwidth+Requested_NetworkBandwidth)>Total_NetworkBandwidth)},
{(Current_SCSIBandwidth+Requested_SCSIBandwidth)>Total_SCSIBandwidth)},
{(Current_SwitchBandwidth+Requested_SwitchBandwidth)>Total_SwitchBandwidth)}, OR
{(Current_ServerBandwidth+Requested_ServerBandwidth)>Total_ServerBandwidth)},
THEN resources constrained.

In the above-recited equation, (1) NetworkBandwidth variables represent the capacity of the transmission frequency bands used by the communication network, (2) the SCSIBandwidth variables represent the relaying capacity of the SCSI interconnect connecting the servers to the data vaults, (3) the SwitchBandwidth variables represent the switching capacity of the ATM switches of the communication network, and (4) the ServerBandwidth variables represent the processing capacity of the servers.

In addition, the variables that have the "Current" prefix represent the portion of the particular bandwidth that is currently being used, while the variables that have the "Requested" prefix represent the portion of the particular bandwidth necessary for the transmission of the requested first presentation. Also, the variables that have the "Total" prefix represent the total amount of the particular bandwidth. The values of all these variables are determined by utilizing conventional traffic management algorithms.

If the server determines that the network resources are not constrained, and would not be constrained by the transmission of the first presentation, then at step 515 the server initiates a timer, and transmits the first presentation of the requested interactive application until the timer expires or until the viewer makes another selection. However, if the server determines (at step 510) that there is, or would be, a network resource constraint, then the process transitions to step 520. At this step, the server initiates a timer, and transmits a second presentation of the requested interactive application until the timer expires or until the viewer makes another selection.

The server transmits both the first and second presentations via dedicated digital information streams. In addition, the second presentation expends less system resources than does the first presentation. For instance, in one embodiment of the invention, the first presentation is a video presentation of the requested interactive application, while the second presentation is a still picture presentation of the requested interactive application.

One specific example of a requested interactive application is a shopping mall application. This shopping mall application can be displayed in an interactive, animated video format or an interactive, motionless picture format. An application pertaining to one of the stores of the shopping mall might serve as another example of a requested interactive application.

Similarly, the departments of this store's application can be displayed in a first interactive, animated video format or a second interactive, motionless picture format. In addition, this scheme for presenting a viewer with interactive videos or pictures of selected interactive shopping applications can continue until the viewer is presented with a number of products in a store. At this stage, the viewer's can then select a particular product. Process 500 can also be utilized to provide animated video presentations or motionless picture presentations of a variety of other interactive applications, such as educational programs.

From steps 515 and 520, the process transitions to step 525, during which a decision is made as to the status of the timer. This embodiment of the invention uses a timer (at either step 515 or step 520) in order to determine whether the viewer makes a selection within a predetermined amount of time after being presented with the presentations of the interactive applications. Specifically, if the timer has expired, then the server determines that, during step 515 or 520, the viewer did not make a selection. One of ordinary skill in the art would appreciate that alternative embodiments of the invention do not utilize timers.

If, at step 525, the process determines that the timer has expired, it transitions to step 530 to terminate its operation. However, if, at step 525, a determination is made that the timer has not expired, then the process deduces that the viewer made a selection during step 515 or 520. Consequently, the process transitions to step 535, to determine if the viewer's selection (made during step 515 or 520) was a selection of another interactive application. If the viewer selected another interactive application, the process transitions to step 555, during which the requested interactive application is identified as the selected interactive application. From step 555, the process transitions back to step 505, in order to process the requested interactive application.

On the other hand, if the viewer did not select another interactive application, the process (at step 535) deduces that the viewer has selected a product (during step 515 or 520), and therefore transitions to step 540 in order to present the viewer with an order menu. After the viewer completes her order, the process then transitions to step 545, during which the process asks the viewer if she wants to view the previous requested interactive application once again. If the viewer responds to this request in the affirmative, then the process transitions back to step 505. However, if the viewer responds to the inquiry at step 545 in the negative, then the process transitions to step 530, in order to terminate the operation of the invention.

Figure 6:
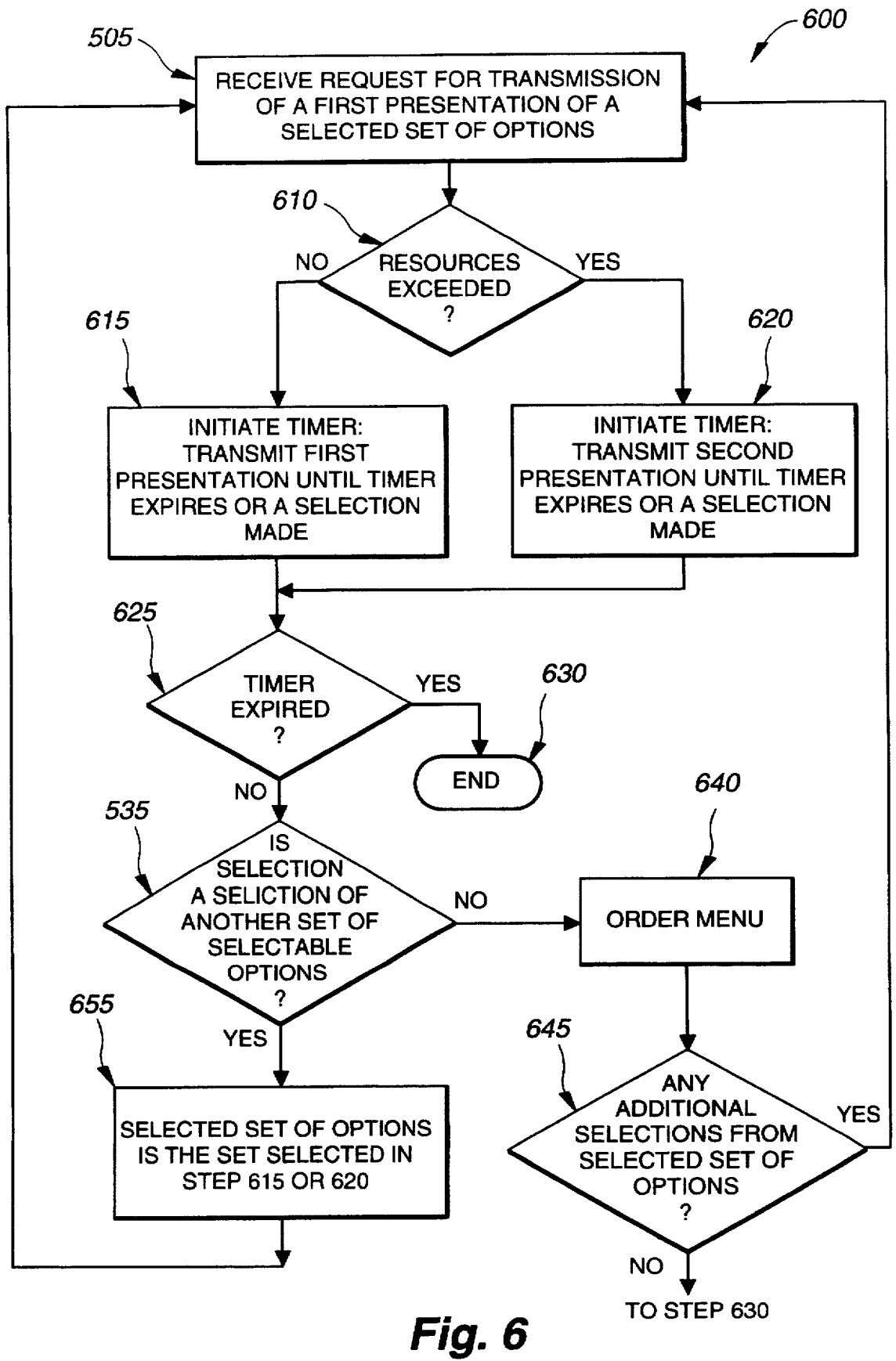
FIG. 6 presents another embodiment of the invention.

FIG. 6 presents another embodiment of the invention for processing requests for interactive applications. This embodiment of the invention can be implemented as a software or a firmware code of the server or the set-top. The following description pertains to the embodiment of the invention that is implemented as the software of the server.

The initial step in the flowchart of FIG. 6 is request step 605. At this step, the viewer requests a first presentation of a selected set of options. In one embodiment of the invention, the viewer actually requests the first presentation of the selected set of options, after the viewer requests the selected set and the server requests the viewer to select between a first presentation and a second presentation of the set. In another embodiment of the invention, the first presentation is the default presentation of the selected set of options (i.e., is the presentation that the server automatically attempts to provide to a viewer that selects the set of options).

The processor then transitions to step 610, during which the server determines (1) if the resources of the system are constrained, or (2) if they would be constrained by the transmission of the first presentation to the viewer. One embodiment of the invention utilizes a mathematical relationship to determine whether the transmission of the requested first presentation would constrain the shared resources of the interactive communication system. In particular, one embodiment of the invention utilizes a mathematical expression to determine whether the interactive system's shared resources have sufficient bandwidth to support the transmission of the requested first presentation. One example of such a mathematical relationship is mentioned above in the description of process 500 of FIG. 5.

If the server determines that the network resources are not constrained, and would not be constrained by the transmission of the first presentation, then at step 615 the server initiates a timer, and transmits the first presentation of the selected set of options until the timer expires or until the viewer makes another selection. However, if the server determines (at step 610) that there is, or would be, a network resource constraint, then the process transitions to step 620. At this step, the server initiates a timer, and transmits a second presentation of the selected set of options until the timer expires or until the viewer makes another selection.

The server transmits both the first and second presentations via dedicated digital information streams. In addition, the second presentation expends less system resources than does the first presentation. For instance, in one embodiment of the invention, the first presentation is a video presentation of the selected set of options, while the second presentation is a still picture presentation of the selected set of options.

One specific example of a selected set of option is a set of stores from which the viewer can shop through the interactive communication system. This set of stores can be displayed in form of an interactive, animated video, or an interactive, motionless picture, of a shopping mall. The departments of a selected store of the shopping mall can provide another set of options. Similarly, this set of departments can be displayed in a first interactive, animated video format, or a second interactive, motionless picture, format.

From steps 615 and 620, the process transitions to step 625, during which a decision is made as to the status of the timer. This embodiment of the invention uses a timer (at either step 615 or step 620) in order to determine whether the viewer makes a selection within a predetermined amount of time after being presented with the presentations of the selected set of options. Specifically, if the timer has expired, then the server determines that, during step 615 or 620, the viewer did not make a selection. One of ordinary skill in the art would appreciate that alternative embodiments of the invention do not utilize timers.

If, at step 625, the process determines that the timer has expired, it transitions to step 630 to terminate its operation. However, if, at step 625, a determination is made that the timer has not expired, then the process deduces that the viewer made a selection during step 615 or 620. Consequently, the process transitions to step 635, to determine if the viewer's selection (made during step 615 or 620) was a selection of another set of options. If the viewer selected another set of options, the process transitions to step 655, during which the set selected at step 615 or step 620 is identified as the selected set of options. From step 655, the process transitions back to step 605, in order to process the selected set of options.

On the other hand, if the viewer did not select another set of options, the process (at step 635) deduces that the viewer has selected a product (during step 615 or 620), and therefore transitions to step 640 in order to present the viewer with an order menu. After the viewer completes her order, the process then transitions to step 645, during which the process asks the viewer if she wants to view the previously selected set of options once again. If the viewer responds to this request in the affirmative, then the process transitions back to step 605. However, if the viewer responds to the inquiry at step 645 in the negative, then the process transitions to step 630, in order to terminate the operation of the invention.

While the invention has been described with reference to numerous specific details, one of ordinary skill in the art would recognize that the invention can be embodied in other specific forms without departing from the spirit of the invention. For example, one of ordinary skill in the art would recognize that, although the invention has been described by reference a home terminal node that includes a set-top terminal and a television, alternative embodiments of the invention utilize home terminal nodes that include a cable modem and a computer. In these embodiments, a display device of the computer is used for displaying the transmitted programming.

In addition, even though one embodiment of the invention has been described by reference to a terrestrial communication network, one of ordinary skill in the art would realize that an alternative embodiment of the invention utilizes a satellite communication system. Also, although each local viewing node 105 of FIG. 1 only has one set-top and one television, one of ordinary skill in the art would appreciate that in an alternative embodiment of the invention each local viewing node has multiple viewing stations. Thus, one of ordinary skill in the art would understand that the invention is not to be limited by the foregoing illustrative details, but rather is to be defined by the appended claims.

We claim:

1. In an interactive communication system, a method of processing requests for interactive applications, said method comprising the steps of:
    (a) receiving a request for displaying a first presentation of an interactive application;
    (b) determining if the display of said first presentation of said interactive application would constrain resources of the interactive communication system; and
    (c) if said display of said first presentation of said interactive application would constrain resources of the system, transmitting a second presentation of said interactive application;
    (d) wherein said second presentation expends less resources of said system than said first presentation.

2. The method of claim 1 further comprising the step of displaying said first presentation of said interactive application, if the display of said first presentation would not constrain resources of the system.

3. The method of claim 1, wherein said determining step includes a step of utilizing a mathematical relationship to determine whether said interactive system's resources have sufficient bandwidth to support the display of said first presentation of said interactive application.

4. In an interactive communication system, a method of presenting sets of interactive options, said method comprising the steps of:

(a) receiving a request to display a first presentation of a set of options;

(b) determining if the display of said first presentation of said set of options would constrain resources of the system; and (c) if the display of the first presentation of the set of options would constrain resources of the system, transmitting a second presentation of the set of options;

(d) wherein said second presentation expends less resources of the system than the first presentation.

5. The method of claim 4 further comprising the step of displaying the first presentation of the set of options, if the display of the first presentation would not constrain resources of the system.

6. The method of claim 4, wherein said determining step includes a step of utilizing a mathematical relationship to determine whether said interactive system's resources have sufficient bandwidth to support the display of said first presentation of said set of options.

7. In an interactive communication system, a method of processing requests for interactive applications, said method comprising the steps of:

(a) requesting transmission of a first presentation of an interactive application through a communication network;

(b) determining if the transmission of said first presentation of said interactive application would constrain resources of the interactive communication system; and (c) if said transmission of said first presentation of said interactive application would constrain resources of the system, transmitting a second presentation of said interactive application;

(d) wherein said second presentation expends less resources of said system than said first presentation.

8. The method of claim 7 further comprising the step of transmitting said first presentation of said interactive application, if said transmission of said first presentation would not constrain resources of the system.

9. The method of claim 7, wherein said determining step includes a step of utilizing a mathematical relationship to determine whether said interactive system's resources have sufficient bandwidth to support the display of said first presentation of said set of options.

10. In an interactive communication system, a method of presenting sets of interactive options, said method comprising the steps of:

(a) requesting transmission of a first presentation of a set of interactive options through a communication network;

(b) determining if the transmission of said first presentation of said set of interactive options would constrain resources of the system; and (c) if the transmission of the first presentation of the set of interactive options would constrain resources of the system, transmitting a second presentation of the set of interactive options;

(d) wherein said second presentation expends less resources of the system than the first presentation.

11. The method of claim 10 further comprising the step of transmitting the first presentation of the set of options, if the transmission of the first presentation would not constrain resources of the system.

12. The method of claim 10, wherein said determining step includes a step of utilizing a mathematical relationship to determine whether said interactive system's resources have sufficient bandwidth to support the transmission of said first presentation of said set of options.

13. An apparatus for processing requests for interactive applications, said apparatus adapted to operate in an interactive communication network, said apparatus comprising:

(a) receiving means for receiving a request to transmit a first presentations of an interactive application;

(b) determining means, coupled to said receiving means, for determining if transmission of said first presentation of said interactive application would constrain shared resources of the interactive communication system; and (c) responding means, coupled to said determining means, for transmitting a second presentation of said interactive application, if said transmission of said first presentation of said interactive application would constrain resources of the system.

14. The apparatus of claim 13, wherein said responding means transmits said first presentation of said interactive application when said transmission of said first presentation would not constrain resources of the system.

15. The apparatus of claim 13, wherein said determining means includes means for calculating available bandwidth of said interactive system's resources in order to determine if said resources can support the transmission of the requested first presentation.

16. An interactive communication system comprising:

(a) a service source storing a plurality of interactive applications;

(b) a plurality of viewing nodes for viewing said interactive applications; and (c) a communication network coupling said service source and said viewing nodes;

(d) wherein said service source includes means for processing requests for said interactive applications, said processing means including:

(1) receiving means for receiving a request from a viewing node to transmit a first presentation of an interactive application;

(2) determining means, coupled to said receiving means, for determining if transmission of said first presentation of said interactive application would constrain shared resources of the interactive communication system; and (3) responding means, coupled to said determining means, for transmitting a second presentation of said interactive application, if said transmission of said first presentation of said interactive application would constrain resources of the system.

17. The apparatus of claim 16, wherein said responding means transmits said first presentation of said interactive application when said transmission of said first presentation would not constrain resources of the system.

18. The apparatus of claim 17, wherein said determining means includes means for calculating available bandwidth of said interactive system's resources in order to determine if said resources can support the transmission of the requested first presentation.

* * * * *